US012346932B2

(12) United States Patent
Sallas et al.

(10) Patent No.: US 12,346,932 B2
(45) Date of Patent: *Jul. 1, 2025

(54) COLLECTION ANALYSIS AND USE OF VIEWER BEHAVIOR

(71) Applicant: Comcast Cable Communications, LLC, Philadelphia, PA (US)

(72) Inventors: Michael Sallas, Radnor, PA (US); Ross Gilson, Philadelphia, PA (US); Chris Bastian, Glenmoore, PA (US); Slade Mitchell, Chester Springs, PA (US); Amit Garg, Delran, NJ (US); John Leddy, Bryn Mawr, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 51 days.

This patent is subject to a terminal disclaimer.

(21) Appl. No.: 17/994,601

(22) Filed: Nov. 28, 2022

(65) Prior Publication Data

US 2023/0306464 A1    Sep. 28, 2023

Related U.S. Application Data

(63) Continuation of application No. 16/990,296, filed on Aug. 11, 2020, now Pat. No. 11,551,262, which is a
(Continued)

(51) Int. Cl.
*G06Q 30/0251*    (2023.01)
*G06F 16/2457*    (2019.01)
(Continued)

(52) U.S. Cl.
CPC .......... *G06Q 30/0255* (2013.01); *G06F 16/24578* (2019.01); *G06F 16/9535* (2019.01);
(Continued)

(58) Field of Classification Search
CPC .......... G06Q 30/0255; G06F 16/24578; G06F 16/9535; H04L 67/306; H04L 67/535; H04W 4/02; H04W 4/029
See application file for complete search history.

(56) References Cited

U.S. PATENT DOCUMENTS 8,456,293 B1 *  6/2013  Trundle ................... G08B 3/00
                                                    705/14.1
8,479,225 B2    7/2013  Covell et al.
(Continued)

FOREIGN PATENT DOCUMENTS

JP    2016179292 A  * 10/2016
WO       99035845 A1    7/1999
WO    2013085524 A1    6/2013

OTHER PUBLICATIONS

Intelligent Data Analysis and Its Applications, vol. 1 Jeng-Shyang Pan • Vaclav Snasel Emilio S. Corchado • Ajith Abraham Shyue-Liang Wang Editors (Year: 2014).*
(Continued)

*Primary Examiner* — Alexandru Cirnu
(74) *Attorney, Agent, or Firm* — Banner & Witcoff, Ltd.

(57) ABSTRACT

Aspects discussed herein relate to systems, apparatuses, and methods to determine when a user remains engaged or stops paying attention to a content item. In response, a snapshot of the user's activity and environment may be obtained to ascertain the reason the user stopped paying attention. If the user stopped paying attention as a result of being uninterested in the content item, the system may replace the content item, such as an advertisement, with a different content item to regain the user's attention. Further, demographic information and the user's interests may be updated for use in scheduling future content items.

21 Claims, 8 Drawing Sheets

Related U.S. Application Data continuation of application No. 15/019,396, filed on Feb. 9, 2016, now Pat. No. 10,776,823.

(51) Int. Cl.

| | |
|---|---|
| *G06F 16/9535* | (2019.01) |
| *H04L 67/306* | (2022.01) |
| *H04L 67/50* | (2022.01) |
| *H04W 4/02* | (2018.01) |
| *H04W 4/029* | (2018.01) |

(52) U.S. Cl.
CPC .......... *H04L 67/306* (2013.01); *H04L 67/535* (2022.05); *H04W 4/02* (2013.01); *H04W 4/029* (2018.02)

(56) References Cited

U.S. PATENT DOCUMENTS

| | | | |
|---|---|---|---|
| 9,215,581 | B2 | 12/2015 | Julian et al. |
| 9,398,335 | B2* | 7/2016 | Hough ............. H04N 21/42203 |
| 10,178,222 | B1 | 1/2019 | Knas et al. |
| 2009/0083631 | A1 | 3/2009 | Sidi et al. |
| 2009/0088068 | A1* | 4/2009 | Ferrazzini ............. H04L 65/611 |
| | | | 455/3.06 |
| 2011/0060807 | A1* | 3/2011 | Martin ................. H04L 67/535 |
| | | | 709/217 |
| 2012/0278904 | A1 | 11/2012 | Perez et al. |
| 2012/0304206 | A1* | 11/2012 | Roberts ................. H04H 60/56 |
| | | | 725/12 |
| 2013/0041976 | A1 | 2/2013 | Hendricks et al. |
| 2013/0189946 | A1 | 7/2013 | Swanson |
| 2013/0275230 | A1 | 10/2013 | Sawyer et al. |
| 2013/0297599 | A1 | 11/2013 | Henshall |
| 2014/0026156 | A1 | 1/2014 | Deephanphongs |
| 2016/0225012 | A1 | 8/2016 | Ha et al. |
| 2017/0213240 | A1 | 7/2017 | Waldron et al. |

OTHER PUBLICATIONS

Salvador Rodriguez. "Netflix test feature 'Sleep Tracker' can detect when users fall asleep." Feb. 28, 2014. Latimes.com, http://www.latimes.com/business/technology,la-fi-tn-netflix-sleep-tracker-detects-users-fall-asleep-20140228,0,5504020.story.

Intelligent Data Analysis and Its applications, vol. 1 Jeng-Shyang Pan—Vaclav Snasel, Emilio S. Corchado—Ajith Abraham, Shyue-Liang Wang Editors pp. 155-164—"A security system based on door movement detecting" (Year: 2014).

* cited by examiner

COLLECTION ANALYSIS AND USE OF VIEWER BEHAVIOR

CROSS-REFERENCE TO RELATED APPLICATIONS

This application is a continuation of and claims priority to U.S. patent application Ser. No. 16/990,296, filed Aug. 11, 2020, which is a continuation of U.S. patent application Ser. No. 15/019,396, filed Feb. 9, 2016 (now U.S. Pat. No. 10,776,823), each of which is hereby incorporated by reference in its entirety.

BACKGROUND

Many entities advertise goods and/or services using commercials on television, webpages, and/or via other media. Advertisers may prefer to target advertisements based on whether a consumer is likely to be interested in their goods and/or services. However, conventional methods of determining targeting information can be unreliable and inaccurate. There is an ever-present need for more reliable and accurate ways to target advertisements and other content to specific consumers and consumer demographic groups.

SUMMARY

Various features described herein may provide targeting information for advertisements and other content. Various features may further provide techniques for re-engaging a user if the user stops viewing or otherwise consuming content. For example, content management functionalities may be implemented to maintain a user's interest.

According to some aspects, a consumption monitoring system may monitor a user to determine the user's attentiveness to a content item being presented by a content presentation device such as a television, a computer, a smart phone, a tablet, a radio, etc. In response to a determination that the user is not attentively focusing on the content item, the consumption monitoring system may determine and/or otherwise obtain information about (e.g., take a snapshot of) the user's activity and environment. The consumption monitoring system may, based on such information, determine the user's interest level in the content item. For example, the consumption monitoring system may determine, based on the information, whether there is an extrinsic environmental circumstance or event that may have caused the user to stop attentively focusing on the content item. For example, from the information, the consumption monitoring system may determine whether a doorbell, home phone, or mobile phone rang, or whether another event occurred, which may have at least partially cause the user to stop consuming the content item (for example, in order for the user to answer the door or phone). If there is no extrinsic environmental event detected, or if it is determined that a detected extrinsic environmental event was not a cause of the user's inattentiveness, the consumption monitoring system may determine that the user is not interested in the advertisement or content item. However, if an extrinsic environmental event is detected, the consumption monitoring system may determine that the user may still be interested in the content item and/or may determine another interest level of the user in the content item.

If the consumption monitoring system determines that the user's interest level in the content item is low (e.g., below a minimum interest level threshold), the consumption monitoring system may determine that the user is likely not interested in the advertisement or content item and may take some action to regain the user's attention, such as replacing the advertisement or content item with another advertisement or content item for presentation to the user. In some instances, the consumption monitoring system may determine when the user is becoming less interested or engaged in the content and, in response, may take action to regain the user's interest. The consumption monitoring system may take some action such as selecting the replacement content item based on, for example, a history of content item topics determined to be of interest to the user or the user's demographic group. The consumption monitoring system may verify whether the replaced content item has obtained the user's attention and, if not, may repeatedly select a different replacement content item to present to the user and/or take another action until the consumption monitoring system presents a content item that obtains the user's attention.

The consumption monitoring system may update a history of content item topics determined to be of interest to the user and/or a history of content item topics determined to be of little or no interest to the user. The user's history may be linked and/or otherwise associated with one or more demographic groups based on the user's demographic characteristics for use in determining which replacement content items are to be selected.

In some embodiments, a computing device may determine, during presentation of a first content item to a user, that the user is in a non-consumption state. In response to determining that the user is not consuming content or is in the non-consumption state, the computing device may determine a user interest level in the first content item based in at least in part on an event associated with the non-consumption state. In response to a determination that the user interest level meets a criterion, the computing device may cause a second content item to be presented to the user.

In some embodiments, a computing device may monitor whether a user is in a non-consumption state in relation to a first content item being provided to a user. In response to determining that the user is in the non-consumption state, the computing device may determine a timeframe based on a time at which the user entered the non-consumption state. The computing device may capture activity data and environmental data associated with the user that occurred during the timeframe.

In some embodiments, a computing device may receive activity data and environmental data associated with a user. The computing device may determine whether the user is consuming a content item provided to the user based on the activity data. In response to determining that the user is not consuming the content item, the computing device may determine a user interest level in a topic of the content item based at least in part on a response of the user to an environmental event.

These features in the summary above are merely illustrative of the features described in greater detail below, and are not intended to recite the only novel features or critical features in the claims.

BRIEF DESCRIPTION OF THE DRAWINGS

Some features herein are illustrated by way of example, and not by way of limitation, in the accompanying drawings. In the drawings, like numerals reference similar elements between the drawings.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
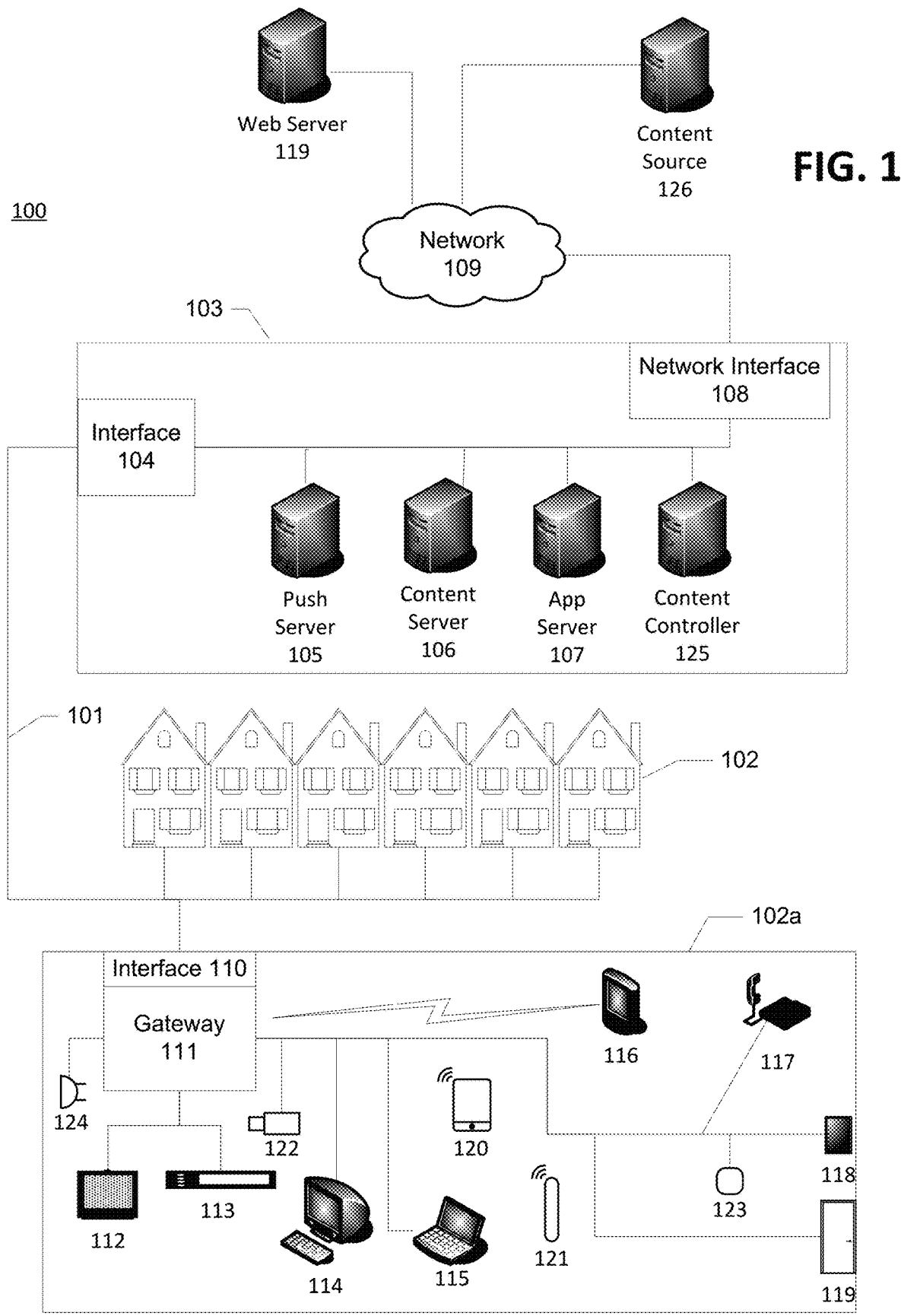
FIG. 1 illustrates an example information access and distribution network in accordance with one or more aspects as described herein.

FIG. 1 illustrates an example information distribution network 100 on which many of the various features described herein may be implemented. The information distribution network 100 may be any type of information distribution network, such as satellite, telephone, cellular, wireless, etc. One example may be a wireless network, an optical fiber network, a coaxial cable network, or a hybrid fiber/coax (HFC) distribution network. Such networks use a series of interconnected communication links 101 (e.g., coaxial cables, optical fibers, wireless, etc.) to connect multiple premises 102 (e.g., businesses, homes, consumer dwellings, etc.) to a local office 103 (e.g., a headend, a processing facility, etc.). The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly. Portions of the links 101 may also be implemented with fiber-optic cable, while other portions may be implemented with coaxial cable, other lines, or wireless communication paths.

The local office 103 may include a termination system (TS) 104, such as a cable modem termination system (CMTS) in an example of an HFC-type network, which may be a computing device configured to manage communications between devices on the network of links 101 and backend devices such as servers 105-107 (to be discussed further below). In the example of an HFC-type network, the TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network, its corresponding cell phones, web server 119, content source 126, etc.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users in the homes. This content may be, for example, video on demand movies, television programs, songs, services, information, text listings, etc. The content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream and/or content item being transmitted to the premises 102.

An example premises 102a may include an interface 110 (such as a modem, or another receiver and/or transmitter device suitable for a particular network), which may include transmitters and receivers used to communicate on the links 101 and with the local office 103. The interface 110 may be, for example, a coaxial cable modem (for coaxial cable lines 101), a fiber interface node (for fiber optic lines 101), or any other desired modem device. The interface 110 may be connected to, or be a part of, a gateway interface device 111. The gateway interface device 111 may be a computing device that communicates with the interface 110 to allow one or more other devices in the home to communicate with the local office 103 and other devices beyond the local office. The gateway 111 may be a set-top box (STB), digital video recorder (DVR), computer server, or any other desired computing device. The gateway 111 may also include (not shown) local network interfaces to provide communication signals to other devices in the home (e.g., user devices), such as televisions 112, additional STBs 113, personal computers 114, laptop computers 115, wireless devices 116 (wireless laptops, tablets and netbooks, mobile phones, mobile televisions, personal digital assistants (PDA), etc.), telephones 117, window security sensors 118, door home security sensors 119, tablet computers 120, personal activity sensors 121, video cameras 122, motion detectors 123, microphones 124, and/or any other desired computers, sensors, and/or other devices. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, and others.

The local office 103 may include a content controller 125. Although shown separately, the content controller 125 may be physically and/or logically combined with one or more of the push server 105, the content server 106 and the application server 107. The content controller 125 may be or otherwise include a computing device responsible for instructing a consumption monitoring system at a user premises 102 to monitor a user's consumption state of a content item provided to the user by a content presentation device (e.g., televisions 112, personal computer 114, laptop computer 115, tablet computer 120, audio music device, or the like). The consumption monitoring system may be or otherwise include any device, or combination of devices, located at premises 102 discussed herein. Alternatively, the consumption monitoring system may be located outside the premises 102, or be located inside and outside the premises, in combination. For example, the consumption monitoring system may be or otherwise include an STB, DVR, tablet, personal computer, phone, tablet, gateway, modem, server, home alarm system, home control system, home monitoring system, sensors, such as motion, sound, eye, or temperature sensors, and the like. A consumption state may correlate to the user's attentiveness in a content item as detected by the consumption monitoring system. For example, a determination by the consumption monitoring system (or by another device in communication with the consumption monitoring system) that a user is not attentively focusing on the content item (e.g., not paying attention to the content item, not interacting with the content item, etc.) being presented may be referred to as a non-consumption state, whereas a determination that the user is attentively focusing on the content item may be referred to as a consumption state. The content controller 125 may also be responsible for determining a user's interest level in the content item in order to determine whether to instruct the content presentation device or another device controlling the content presentation device to present a different replacement content item in place of the content item.

The consumption monitoring system may be used to collect information that may be informative to make a determination as to whether a user is presently consuming (e.g., watching, listening to, and/or otherwise consuming) a content item, such as a movie, a television series, an advertisement, a commercial, a video clip, an audio presentation, and/or the like. The consumption monitoring system may be implemented using any desired computing device, or combination of computing devices, such as computing device 200 discussed below, and may be (or be a part of), for example, the gateway 111, the STB 113, the content presentation device itself such as the television 112, the personal computer 114, the laptop computer 115, the tablet computer 120, the smartphone 116, or the like. The consumption monitoring system may be communicatively connected to a variety of devices at the premises, such as any of elements 110-123 of FIG. 1, and/or obtain information related to one or more services provided to the user (e.g., a telephony service and/or an Internet service).

The consumption monitoring system may collect information for determining the state of the user in any of a number of ways, and may include or be communicatively connected to one or more devices (e.g., sensors) in order to collect such information. For example, the video camera 122 may provide a video feed and/or video-related information, and/or the microphone 124 may provide an audio feed and/or audio-related information, to the consumption monitoring system. Another sensor that may provide such information to the consumption monitoring system may include, for example, the personal activity monitor 121. Many personal activity monitors are commercially available and can provide information about the user's physical motion. Still other sensors may include, for example, eye-tracking sensor devices, home security sensors such as the window security sensor 118, the door sensor 119, the motion detector 123, and/or a home security system in general. The consumption monitoring system may further receive information from and/or concerning other devices such as the mobile device 116, the tablet 120, the phone 117, the STB 113, the television 112, the personal computer 114, the laptop computer 115, and/or the like. For example, the information may include information about incoming and/or outgoing telephone calls via the mobile device 116 and/or the telephone 117, information about web browsing activities via the personal computer 114, the laptop computer 115, the mobile device 116, and/or the tablet 120, channel selection and/or volume selection information via the STB 113 and/or the television 112, etc. Where these devices include sensors such as motion sensors (e.g., many smart phones and tablets have miniature gyroscopes), location sensors (e.g., GPS and/or wi-fi triangulation), microphones, and/or video cameras, then information relating to these sensors may also be provided to the consumption monitoring system. One or more of the sensors may be part of the consumption monitoring system itself.

The consumption monitoring system may collect the information from the one or more devices and may also analyze at least some of the information to determine a state of the user, which may include any information that may be relevant to whether the user is consuming the content, such as information indicating whether the user is detected as being present or not present, whether the user is facing the presented content or facing away from the presented content (and/or facing another person), whether the user's eyes are open or closed, the user's movement, whether the user is talking and/or gesturing, the user's position (e.g., sitting, lying down, standing up, slouching), the user's location in a house (e.g., the room where the content is being presented, another identified room, etc.), whether the user is moving and/or the nature and/or timing of any movement, whether the user is making loud abrupt noises (such as yelling, cheering, or booing) or softer noises, particular speech by one or more persons (e.g., via speech recognition technology), how many people are present in an area where the content is being presented, whether and/or in what manner the user is using another device such as a phone (e.g., talking on the phone), a computer (e.g., browsing a particular website and/or entering a particular search query), a state of another device (e.g., an incoming or outgoing call on the phone 117, a home security alarm state).

As an example, the user may be watching a movie being presented on the television 112. At one or more points during the movie, information from the video camera 122, the microphone 124, and/or the personal activity monitor 121 may be used to determine the state of the user. More than one of each type of monitoring device can be used to increase accuracy, multiple views, etc. At one point, the consumption monitoring system may determine that the user is in a non-consumption state, perhaps because it is determined, based on the information, that the user is no longer consuming the content and/or has fallen asleep. Or, while the user is watching the movie, an incoming call is received by the phone 117, and information about the incoming call may be provided to the consumption monitoring system. The information about the incoming call may include, for example, the time of the call, the caller ID information of the caller, which device receives the call, whether the call has been answered, how many rings occurred before the call was answered, and/or the duration of the call. Shortly after the incoming call begins to ring, the video camera 122 may provide information to the consumption monitoring system that may indicate that the user has gotten up, left the room, and/or picked up the phone 117. In the meantime, the personal activity monitor 121 may also indicate movement consistent with such an activity. Based on some or all of this information, the determined state of the user may be that the user is not presently consuming content and/or is no longer present. As will be described below, the consumption monitoring system or another device may also determine whether the non-consumption state is due to a lack of interest in the content being presented or for another reason unrelated to the content being presented.

The consumption monitoring system may locally perform one or more determinations of whether the user is consuming a content item based on data collected related to the user's attentiveness to the provided content item. For example, in response to determining that the user is in a consumption state, the consumption monitoring system may determine to continue monitoring the user's consumption state. Additionally, in response to determining that the user is in a non-consumption state (e.g., the user is not paying attention to content provided by the content presentation device), the consumption monitoring system may collect information, generate a non-consumption state report. The non-consumption state report, or data associated with the report, may be transmitted to the content controller 125 so that the content controller 125 may identify the content item, determine the user's interest level in the content item, and/or determine whether to replace the content item, as discussed in detail in FIG. 3 below, for example.

While in the above examples, the consumption monitoring system determined the consumption state, in some examples, the content controller 125 at the service provider side may determine the consumption state. As an example, the content controller 125 may instruct the consumption monitoring system to continuously transmit monitoring information relating to the user, information associated with the provided content item, and the user's environmental information, upstream to the content controller 125. In response to determining that the user is in a consumption state, the content controller 125 may continue to monitor the user's consumption state. In response to determining that the user is in a non-consumption state, the content controller 125 may generate a timestamp associated with the non-consumption state. As discussed in further detail below, the content controller 125 may identify the content item, determine the user's interest level in the content item, and determine whether to replace the content item. Replacing the content may comprise adjusting the content item to another version of the content item (e.g., changing a scene, changing the language or rating version, etc.).

As used herein, when one computing device instructs a different computing device to perform one or more operations, the computing device may send one or more instructions with one or more parameters for the operations to the different computing device, which may execute the one or more instructions with the one or more parameters to perform the instructed operations.

Figure 2:
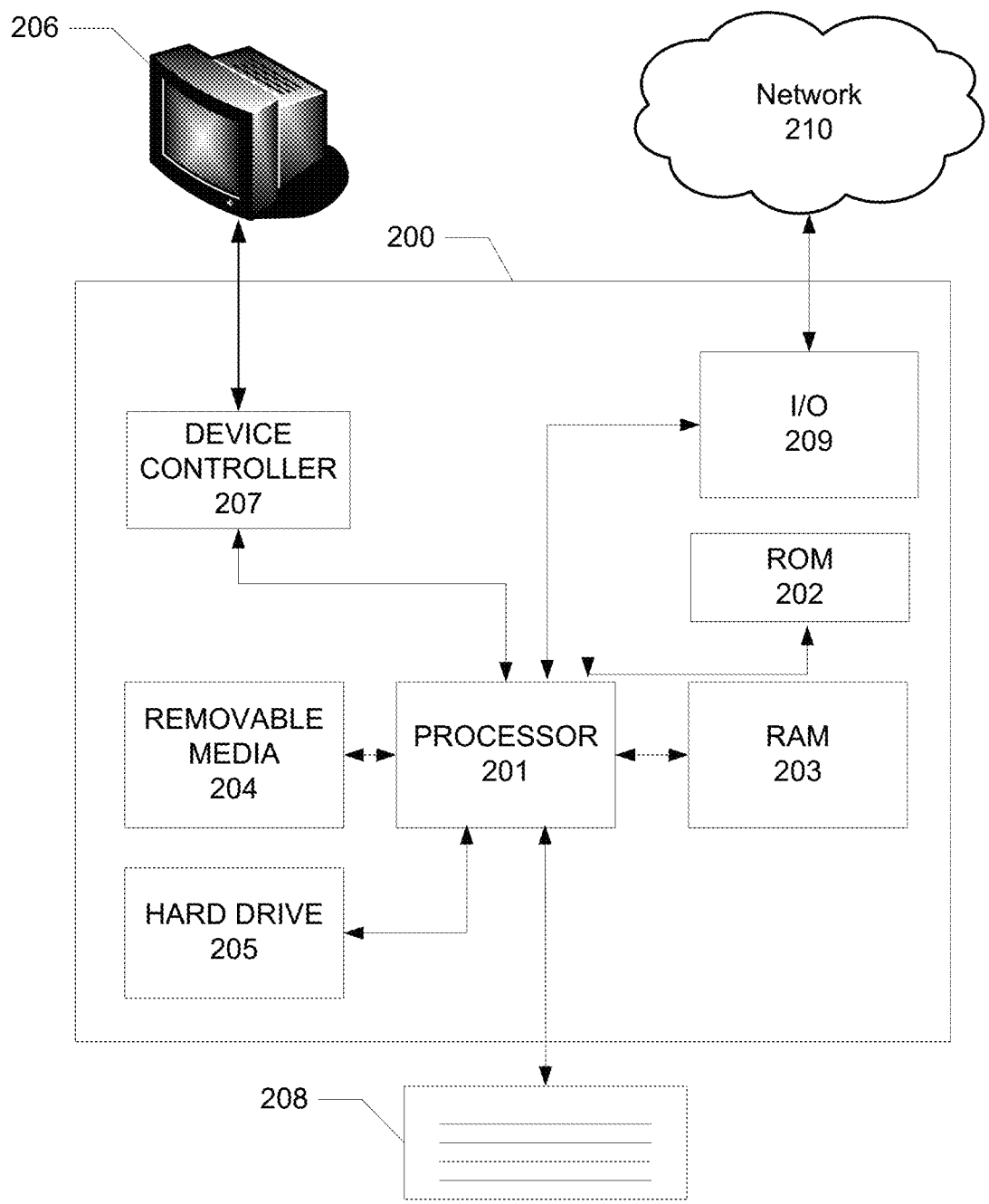
FIG. 2 illustrates an example computing device that may be used to implement any of the features and devices described herein.

FIG. 2 illustrates general hardware elements of an example computing device 200 that can be used to implement any of the elements discussed herein and/or illustrated in the figures. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, a removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, camera, etc. The computing device 200 may also include one or more network interfaces, such as input/output circuits 209 (such as a network card) to communicate with an external network 210. The network interface may be a wired interface, wireless interface, or a combination of the two. The interface 209 may include a modem (e.g., a cable modem), and network 210 may include the communication links 101 discussed above, the external network 109, an in-home network, a provider's wireless, coaxial, fiber, or hybrid fiber/coaxial distribution system (e.g., a DOCSIS network), or any other desired network.

The FIG. 2 example is an example hardware configuration. Modifications may be made to add, remove, combine, divide, etc. components as desired. Additionally, the components illustrated may be implemented using basic computing devices and components, and the same components (e.g., processor 201, ROM 202, etc.) may be used to implement any of the other computing devices and components described herein. For example, the various components herein may be implemented using computing devices having components such as a processor executing computer-executable instructions stored on a computer-readable medium, as illustrated in FIG. 2.

One or more aspects of the disclosure may be embodied in computer-usable data and/or computer-executable instructions, such as in one or more program modules, executed by one or more computers (such as computing device 200) or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Example data structures may be used to illustrate one or more aspects described herein, but these are merely illustrative examples.

Figure 3:
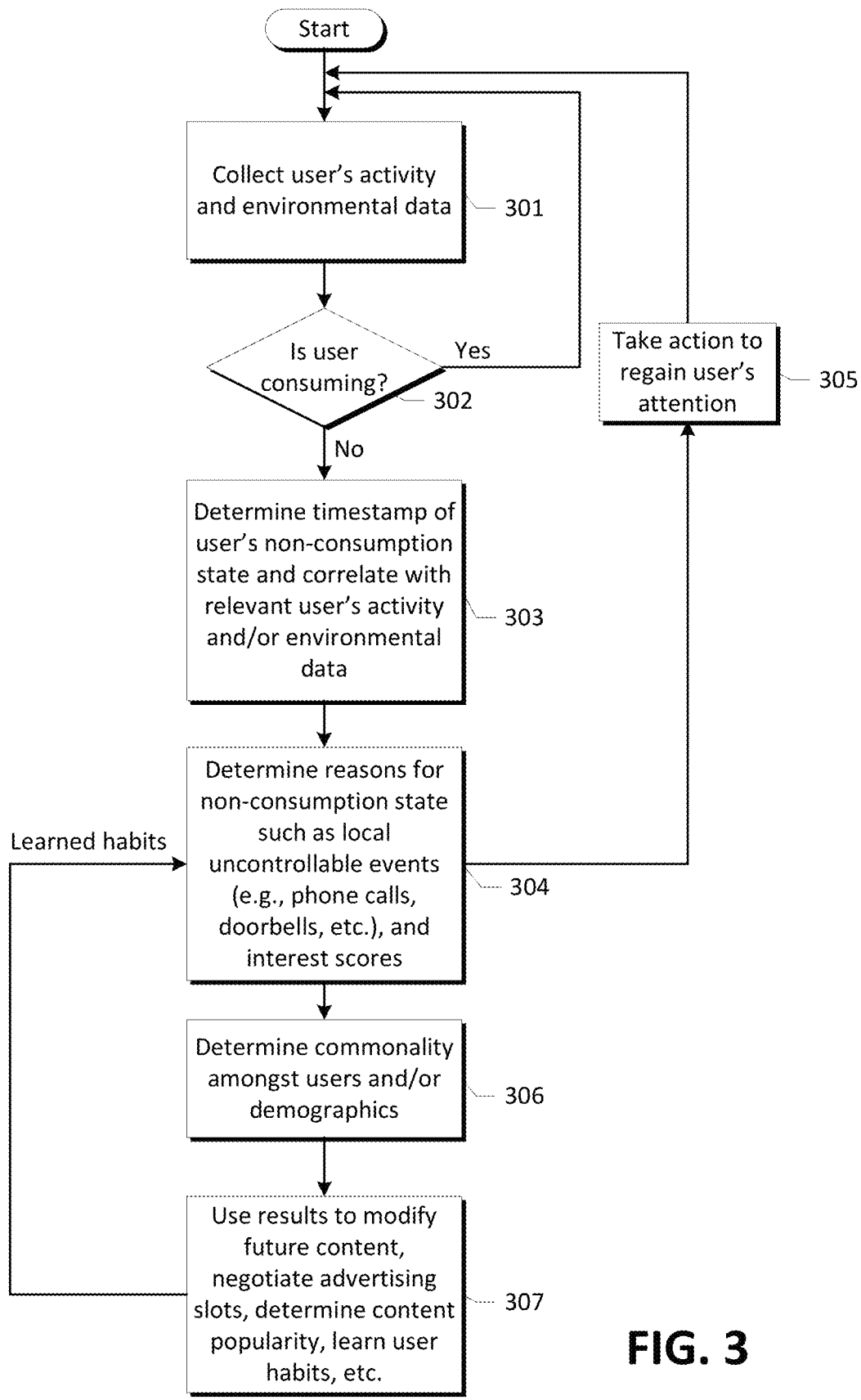
FIG. 3 illustrates an example flow chart for performing a method in accordance with one or more aspects as described herein.

FIG. 3 illustrates an example flow chart for performing a method in accordance with one or more aspects as described herein. The method of FIG. 3 and/or one or more steps thereof may be performed by a computing device (e.g., an STB, a gateway, a headend device, etc.). The method illustrated in FIG. 3 and/or one or more steps thereof may be partially or fully embodied, for example, in computer-executable instructions that are stored in a computer-readable medium, such as a non-transitory computer-readable memory. In some instances, one or more of the steps of FIG. 3 may be performed in a different order and/or combined. In some instances, one or more of the steps of FIG. 3 may be omitted and/or otherwise not performed.

As seen in FIG. 3, the method may begin at step 301 in which a computing device (e.g., the consumption monitoring system) may collect a user's activity and environmental data from a variety of computing devices, monitors, sensors, etc. The user's activity and environmental data may include, for example, the location of the user (e.g., location within a room, identification of which room the user is in, location relative to the content presentation device, etc.), orientation of the user (e.g., facing or away from the content presentation device), the posture of the user, body movement of the user, heart rate and/or other biological signs of the user, eye movement of the user, speech, and/or other activities of the user, which may be informative as to whether the user is present and attentive to the content item (e.g., watching the content item, talking about the content item, or the like). The user activity and environmental data may also include any information about the environment surrounding the user (e.g., that the doorbell rang, that the phone rang, whether a tweet or text message was received or sent by the user, what web page is being browsed by the user, whether keyboard typing sounds are detected via a microphone, whether a home alarm was triggered, the temperature in the room, sounds emitted from sources other than the user, appliance use data (e.g., information about the usage of devices at the user premises), the presence or movement of one or more other persons or animals in the room or in another room, the user's calendar appointments, etc.).

In one example of implementing step 301, the consumption monitoring system may begin collecting the user's activity and environmental data in response to one or more triggering events defined in the instructions sent by the content controller 125. One triggering event may correspond to, for instance, when one or more content items are provided by a content presentation device to the user. As an example, the consumption monitoring system may begin collecting the data when an image or video starts being displayed by the content presentation device and/or when audio is output by a speaker. In one or more arrangements, the content controller 125 may transmit instructions to the consumption monitoring system to monitor a user's consumption of the one or more content items provided by the content presentation device. As discussed herein, a content item may include, for example, an image, video (e.g., a movie, television program, etc.), audio feed (e.g., music) and/or the like. The content presentation device may be or otherwise include, for example, a television, personal computer, laptop computer, tablet computer, stereo system, gaming console, smartphone, mobile phone, or the like.

The consumption monitoring system may collect the user's activity data and environmental data from a variety of sensors of one or more computing devices at the user's location. One or more sensors may be part of the consumption monitoring system or may be part of one or more remote devices (also referred to herein as remote sensor devices) communicatively connected with the consumption monitoring system. A sensor may be part of, for example, the display device (e.g., television), entertainment/gaming console, gaming console, home security system, and devices typically carried on the person such as smartphones, smartwatches, fitness trackers, health trackers, etc. If a sensor is part of the consumption monitoring system, the consumption monitoring system may directly obtain activity and/or environmental data from the sensor. If a sensor is remote from the consumption monitoring system, the consumption monitoring system may discover the computing devices by scanning for devices connected to a particular network and/or by manual input from the user or operator of the headend.

Further, the consumption monitoring system may transmit instructions to the remote sensor devices to instruct the sensor devices to begin to periodically and/or continuously obtain data relating to the user and/or his or her environment via its one or more sensors and record such data in a recordation log for periodic transmission to the consumption monitoring system (e.g., a push relationship). In addition or alternatively to the push relationship, a pull relationship may be used. Namely, the consumption monitoring system may query the remote sensor device for its data and, in response, may receive the sensor's data from the remote sensing device. Accordingly, a sensor may transmit its sensing data to the consumption monitoring system either periodically on its own or in response to a query from the consumption monitoring system or in response to an action it detected. The transmission may be in the form of a message comprising the data from the sensor and an identifier of the transmitting remote sensor device. The identifier may be a media access control (MAC) address or other identifier of the remote sensor device.

Additionally, the message may also include one or more timestamps of when the sensing data was generated and/or otherwise obtained by the sensor device. The message may include, for example, the time period since the computing device has last transmitted its sensing data to the consumption monitoring system. A history of sensing data in the recordation log may also be transmitted to the consumption monitoring system. The history of sensing data may include sensing data that was generated prior to the current/recent sensing data (e.g., all sensed data within the last two hours, or since yesterday, etc.). Each type of sensor will be discussed in detail below in conjunction with step 302.

In step 302, a computing device (e.g., the consumption monitoring system, the content controller 125, etc.) may, for example in real-time, determine whether the user is presently consuming a content item provided by the content presentation device based on the user's activity and environmental data. As discussed herein, when the user is presently consuming a content item, the user may be said to be in a consumption state. Similarly, when the user is not presently consuming a content item, the user may be said to be in a non-consumption state.

As noted above, the consumption monitoring system may collect information from a variety of sensors in step 301 and determine whether the user is in a consumption or non-consumption state in step 302. The sensors may include a variety of different types of sensing devices to aid in determining whether the user is currently consuming a provided content item. One or more of the sensors may determine location data of a computing device that may be physically on the user's person, such as personal activity monitors (PAMs), smartwatches, mobile phones, etc., and which may be used to approximate the user's location. For example, a computing device (e.g., a smartphone) may include a global positioning system (GPS) sensor that may either locally compute and/or otherwise obtain from a remote device the computing device's GPS coordinates (e.g., a set of latitude and longitude coordinates) or other location identifying information. The computing device may determines its location identifying information using triangulation with other devices (e.g., cell phone triangulation, Wi-Fi triangulation), detection of a beacon from a particular device, etc. The computing device may send the GPS coordinates or other location identifying information to the consumption monitoring system along with a timestamp of when each set of GPS coordinates was computed and/or otherwise determined by the computing device. Using this information, the consumption monitoring system may determine the location of the computing device, which is the likely location of the user. The consumption monitoring system may compare the computing device's location with the known location of the content presentation device to determine whether the user is close enough to the content presentation device to actually be able to consume a content item by determining a distance between the computing device and the content presentation device. In some instances, the distance between the computing device and the content presentation device may be determined using audible sounds. For example, the computing device may include a microphone that may receive audible sounds from the content presentation device and may estimate the distance based on the volume of the audible sounds. If the distance between the computing device and the content presentation device is less than or equal to (or alternatively, is simply less than) a maximum threshold distance, the consumption monitoring system may determine that the user is close enough to be able to consume the content items provided by the content presentation device. Otherwise, if the distance between the computing device and the content presentation device is greater than (or alternatively, is greater than or equal to) the maximum threshold distance, the consumption monitoring system may determine that the user is not close enough to be able to consume the content items provided by the content presentation device. The maximum threshold distance may be predetermined or it may be determined dynamically based on one or more factors. This is only one example of how the consumption monitoring system may determine whether a user is close enough to consume a presented content item based at least in part on location identifying information, e.g., the location of the computing device, the location of the content presentation device, and/or a distance between the two devices.

Additionally or alternatively, the location identifying information may include one or more received signal strength indications (RSSIs). The consumption monitoring system may continuously or intermittently (e.g., periodically) query a computing device typically on a user's person (e.g., smartwatch, smartphone, etc.) and, in response, may receive a response from the computing device via a network (e.g., a Wi-Fi network). The consumption monitoring system may determine an RSSI value based on the received response (for instance, either the signal strength of the response or an RSSI value in the response itself) and use the RSSI value to approximate the distance between the consumption monitoring system and the computing device. For example, a higher RSSI value may be associated with stronger signal strength of the received response, which may indicate that the computing device is located in close proximity to the consumption monitoring system. Conversely, a lower RSSI value may be associated with lower signal strength of the received response, which may indicate that the computing device is located farther away from the consumption monitoring system. If the RSSI value is below a minimum threshold RSSI value (or alternatively, below or equal to the minimum threshold RSSI value), the consumption monitoring system may, for example, determine that the user is not presently consuming a content item since the user is likely not in the same room as the content presentation device. The response may include, for example, a network identifier of the network used to transmit the response and/or a timestamp of when the response was sent to the consumption monitoring system.

One or more of the sensors that provide input to the consumption monitoring system may be accelerometers, gyroscopes and/or other motion detectors, which may be included within one or more computing devices (e.g., PAMs, smartphones, smartwatches, etc.). These computing devices may send motion data (e.g., acceleration information, velocity information, direction information) of the computing device to the consumption monitoring system along with one or more timestamps of when the motion occurred. Because the user is moving the computing device, such motion data may be used to determine the user's excitement or energy level which may be useful in determining a user's interest level in a content item. Thus, a user's consumption or non-consumption state may be determined at least in part on the motion data. For instance, if the user is moving the computing device faster than a preset threshold speed/velocity, the consumption monitoring system may determine that the user is excited. If the user is moving the computing device slower than the preset threshold speed/velocity, the consumption monitoring system may determine that the user is awake but not excited. If the user has not moved the computing device for at least a preset time period, the consumption monitoring system may determine that the user is asleep and, thus, not consuming the presented content items.

One or more of the sensors may be heart rate monitors and/or other sensors that measure a bodily function of the user, which may be included within a variety of computing devices such as smartphones, personal activity monitors (PAM), health monitors, etc. The computing devices may send to the consumption monitoring system a measurement of a bodily function of the user (e.g., the user's heartrate) and a timestamp of when the measurement was taken. The consumption monitoring system may use the measurements to determine an energy or excitement level of the user. Thus, a user's consumption or non-consumption state may be determined based at least in part on bodily function measurement data. For example, if the user's heartrate is greater than a first preset threshold, the consumption monitoring system may determine that the user is excited. If the user's heartrate is less than the first preset threshold but greater than a second preset threshold, the consumption monitoring system may determine that the user is awake but not excited. If the user's heartrate is less than the second preset threshold, the consumption monitoring system may determine that the user is asleep and thus not consuming the presented content item.

One or more sensors may be optical sensors that capture the user's physical position in an image or video. The consumption monitoring system may receive imaging data of the user's position from optical sensors (e.g., video recorders, cameras, or the like) and a timestamp of when the image or video was taken. The imaging data (e.g., images and/or video) may be of an area near the content presentation device (e.g., an area immediately in front of a television, computer, tablet, etc.). The consumption monitoring system may determine whether the user is in a consumption state based at least in part on the imaging data. The consumption monitoring system may, using the received imaging data, determine how many people are present in the room where the content items are being presented and whether each of them is physically in a position such that they can view the presented content item. Thus, a user's consumption or non-consumption state may be determined based at least in part on the imaging data. For instance, the consumption monitoring system may determine the direction each person is facing (e.g., whether a person is facing away from or towards the television) and whether each person's eyes are open or closed and for what duration (e.g., a brief wink, a nap, etc.). The consumption monitoring system may, for example, use eye-tracking algorithms to determine the objects each person is viewing. For example, the consumption monitoring system may determine if a person is looking at the television, smartphone, tablet, computer, or any other object. In instances where the person is looking at a screen of the display device, the consumption monitoring system may determine what part of the screen the person is viewing or what content item on the screen the person is viewing. In some instances, the consumption monitoring system may identify each person in the room using person identification technologies such as facial recognition. Thus, the consumption monitoring system may determine whether each person present in the room is actually being attentive to the presented content item.

One or more sensors may be a microphone or other audio input devices to record audible sounds produced by the user (e.g., a conversation with another user, a cheer, etc.). The consumption monitoring system may include or be communicatively connected to a speech recognition module, which may identify words uttered by the user based on audio data provided from the audio input device(s). The consumption monitoring system may determine a topic of conversation using the uttered words and may also determine a topic of the content item by either receiving an indication of content item's topic from the headend 103 or by locally determining content item's topic using e.g., closed captioning information. The consumption monitoring system may compare the topic uttered by the user with the content item's topic to determine whether the user is speaking about the content item. If the topics match, the consumption monitoring system may determine that the user is consuming the content item. Otherwise, if the topics do not match, the consumption monitoring system may determine that the user is not consuming the content item. The consumption monitoring system may, for example, determine that the user is not consuming the content item if the volume level of the content item is below a minimum volume level threshold (e.g., the user has muted the television program). Specific words, a volume level, and/or other characteristics of detected sound (e.g., emitted from the content presentation device, from the user, and/or from the user's environment) may be associated with different level of excitement of the user and/or with other user status. For example, a loud cheer may be associated with a high excitement level of the user for the content item. Thus, the user's consumption or non-consumption state may be determined at least in part on the audio data.

In addition to the user's physical position and posture, user activity and environmental data may also include any other data related to the user's actions. As an example, user activity and environmental data may be an indication of a webpage (e.g., a URL) the user is visiting on a computing device such as a tablet. As another example, user activity and environment data may include telephonic information. For instance, the gateway 111 may intercept incoming (or outgoing) telephone calls and determine who is calling, whether the phone was answered, and, if so, the duration of the conversation. In some instances, the local office or gateway 111 may determine what content each party to the telephone call is viewing and whether they are viewing the same content. As yet another example, user activity and environmental data may include whether a door or window was opened, which may be received from the home security system. As still yet another example, user activity and environmental data may include appliance use data, which may be received from a smart appliance. For instance, a smart refrigerator may send a timestamp of when one of its doors has been opened. For instance, a microwave may send a timestamp of when its door has been opened.

The user activity and environmental data may include information from a home security system. For example, the home security system may transmit, to the consumption monitoring system, information relating to whether a security alarm has been activated, whether a window or door has been opened, whether the doorbell was rang, whether the garage door has been opened, and/or the like. The information may also include one or more timestamps of when the alarm was triggered, door was opened, window was opened, etc.

The user activity and environmental information may include, for example, communication information from a variety of computing devices. The gateway 111 may intercept and analyze various communications to and/or from the computing devices. The communication information may include, for example, requests for a webpage or query for a web-based search engine. The communication information may include telephonic communication information received from a phone or the gateway 111. The telephonic communication information may include the time at which a phone (e.g., home phone, smartphone, or other phone) rang and an identifier of the person attempting to contact the user. As an example, the telephonic information may include an indication that the user's home phone rang at 2:00 pm and the call was from the user's mother-in-law. Other communication data may include email notifications, instant messages, requests for IP-enabled voice chats, text messages, mobile app specific communications, etc. and may include similar information to that discussed above for a telephonic call. The gateway 111 may transmit the intercepted information to the consumption monitoring system. Alternatively, the gateway 111 may itself be or otherwise comprise the consumption monitoring system.

As mentioned above, the user activity and environmental data may include information received from smart appliances. In one example, a microwave may send a timestamp of when the microwave outputted an audible alarm (e.g., beeped) to signal that the food is done cooking.

The consumption monitoring system may determine whether the user is in a consumption state or a non-consumption state based on various user activity and/or environmental data locally or remotely obtained from one or more of the above-described sensor devices. The consumption monitoring system may have received preset rules of combinations of conditions that lead to a determination of consumption state or a non-consumption state. As will be explained below, the rules may also dynamically change over time based on learned user habits (which may be based on the user activity and/or environmental data), such as via a computer learning algorithm.

If the consumption monitoring system determines that the user is in a consumption state (e.g., is presently watching or listening to a video program on the television), the consumption monitoring system may continue to repeat the steps of 301 and 302 to repeatedly collect more data relating the user and his or her environment as well as repeatedly determine whether the user is still in a consumption state.

In response to determining that the user is in a non-consumption state (e.g., that the user is not watching and/or listening to a displayed content item), the consumption monitoring system may, in step 303, determine a timestamp of the user's non-consumption state and correlate relevant user activity and/or environmental data with the user's non-consumption state. The consumption monitoring system may generate a timestamp of when the consumption monitoring system determined that the user entered into a non-consumption state. A timestamp, as discussed herein, may be in any format. For example, a timestamp may include multiple fields to account for year, month, day, hour, minute, seconds, tenths of seconds, am or pm, day of the week, etc. (e.g., Jun. 16, 2014 at 1:12 pm). The consumption monitoring system may, for instance, use an internal clock to determine the timestamp for the instance of the user's non-consumption state. The internal clock may be synchronized with a clock of the headend used in transmitting the data stream (e.g., an edge server) to ensure that the timestamp is accurate as to both the consumption monitoring system and the headend. As a result, the timestamp may be used either by the headend without needing to adjust for clock drift. The consumption monitoring system may also identify the content item. In some instances, the consumption monitoring system may determine an identifier of the content item itself. In other instances, the consumption monitoring system may determine an identifier of the stream that transported the content item (e.g., channel 5) so that the headend may use the timestamp of the user's non-consumption state and the stream identifier to determine the content item that was being provided to the user at that time.

The instructions received from the headend may include a dynamic timeframe for use in determining which data from the remote sensors should be correlated with and/or is otherwise relevant in determining the reasons for the user's non-consumption state. The dynamic timeframe may have an end time equal to (or otherwise based on) when the user entered a non-consumption state. Using the dynamic timeframe and the timestamp of when the user entered a non-consumption state, the consumption monitoring system may determine the start time of the preset dynamic timeframe. As an example, the dynamic timeframe may be a look-back timeframe of a preset amount of time such as 10 seconds before the present time. If the user entered a non-consumption state at 10:30 am and 30 seconds, the consumption monitoring system may identify this time as the end time of the dynamic timeframe and determine that the start time of the dynamic time period is 10:30 am and 20 seconds. Accordingly, the relevant time period may be from 10:30 am and 20 seconds to 10:30 am and 30 seconds. The consumption monitoring system may correlate and/or otherwise link user activity and/or environmental data having a timestamp within this time period to the user's non-consumption state to effectively take a "snapshot" of the user and/or his or her environment just before the user stopped consuming the content item so that either consumption monitoring system or a headend device may determine a possible reason for the user's non-consumption state. As an example, if the doorbell rang within this time period, such information would be correlated with the user's non-consumption state. The duration of the dynamic timeframe may be any amount of time, for example, 1 second, 5 seconds, 10 seconds, 30 seconds, 1 minute, or more, or any amount of time in between these values.

The end time of the dynamic timeframe may be the time when the user entered a non-consumption state. Or, the end time may be a time other than, yet based on or otherwise associated with, the time when the user entered the non-consumption state, such as a preset duration (e.g., 5 seconds, 15 seconds, etc.) after the user entered the non-consumption state. As an example, if it is determined that the user entered a non-consumption state at 10:30 and 30 seconds, the start time may be 10:30 and 20 seconds and the end time may be 10:30 and 40 seconds. The preset duration after the user enters the non-consumption may enable the consumption monitoring system to continue to collect user activity and/or environmental data and correlate that data with the user's non-consumption state. While the duration in the above examples is preset, the duration may alternatively be dynamically chosen and, for example, be a different duration that depends upon the user activity data and/or the environmental data received by the content consumption device. By continuing to collect the data after the user enters a non-consumption state, the consumption monitoring system may be able to obtain data that may reflect why the user entered a non-consumption state. As an example, if the user leaves his seat (entering a non-consumption state) immediately after the doorbell rang, the consumption monitoring system may be able to detect whether the user answered the door a few seconds later.

The consumption monitoring system may generate a non-consumption state report based on the data collected. The non-consumption state report may include, for example, the timestamp of the non-consumption state, the content item identifier, the stream identifier, the data obtained from the sensor devices that have been correlated with the user's non-consumption state (e.g., data that has a timestamp within the preset dynamic time period), and the data's timestamps. This data may include local uncontrollable events (e.g., phone calls, doorbells, etc.) that occurred just before the user entered into a non-consumption state. The non-consumption state report may include an indication of the start time and the end time of the relevant timeframe.

Figure 4:
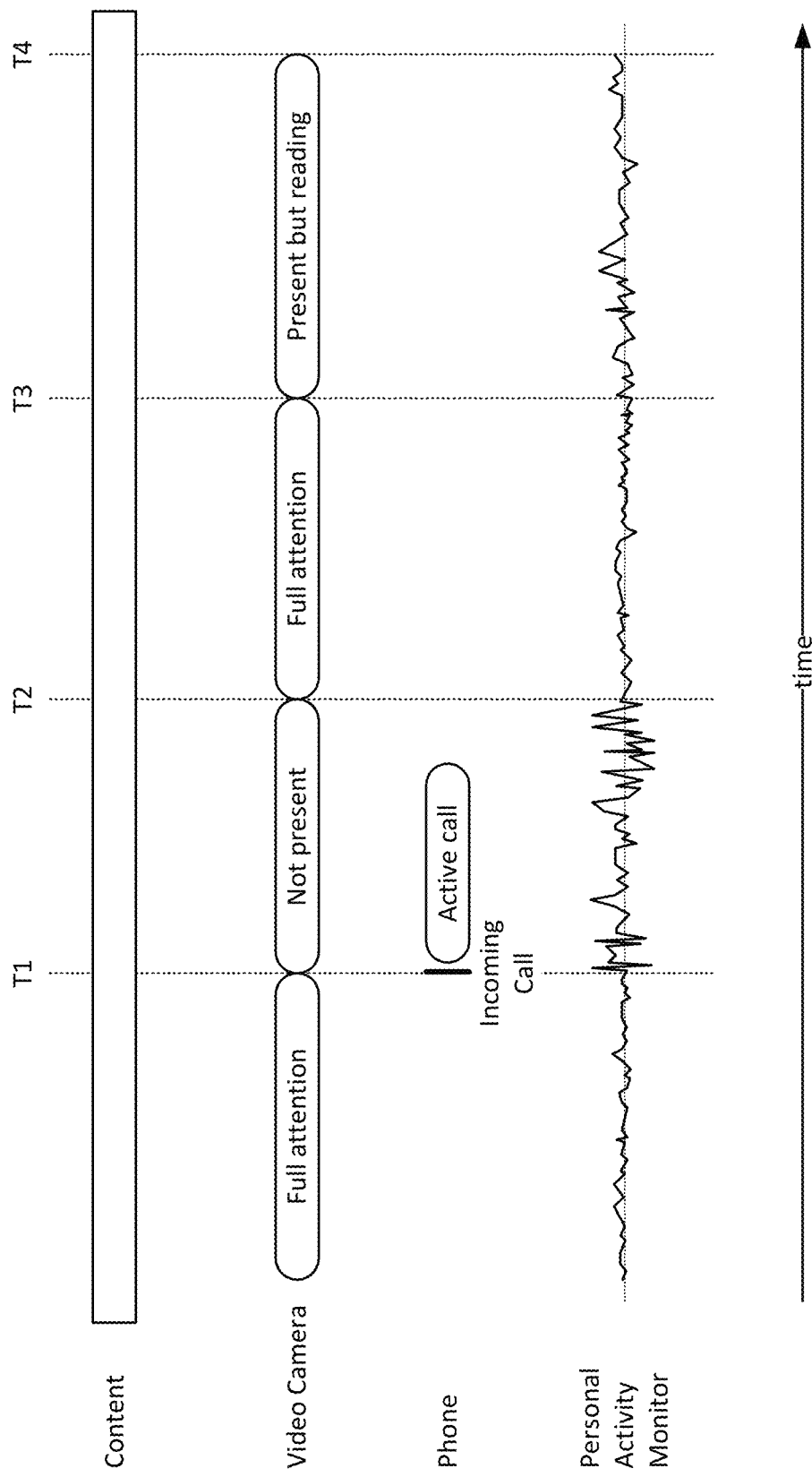
FIG. 4 illustrates an example timeline of events and information in accordance with one or more aspects as described herein.

FIG. 4 illustrates an example timeline of events and information for a non-consumption state report in accordance with one or more aspects as described herein. As an example, the user may be watching a movie being presented on television 112. The consumption monitoring system may collect user activity and/or environmental data from a variety of sensor devices including, for example, video camera 122, microphone 124, phone 117, and/or personal activity monitor (PAM) 121 (step 301). The consumption monitoring system may determine that the user is consuming the content item (e.g., the movie has the user's full attention) up until time T1 (steps 301 and 302). At time T1, the consumption monitoring system may determine that the user has answered an incoming call (e.g., a local uncontrollable event) and is now in a non-consumption state since the user is both not physically present near the content presentation device (e.g., within a preset distance) and is participating in the telephone call (step 302). The consumption monitoring system may determine the timestamp of the user's non-consumption state (e.g., T1) and correlate relevant user's activity and/or environmental data (step 303). In this example, the environmental data may include ringing of the phone 117 as a result of the incoming call, and the user activity data may include an indication that the user answered the call, each of which may be included in the non-consumption state report.

Returning to FIG. 3, in step 304, a computing device (e.g., the consumption monitoring system, the content controller 125) may determine one or more reasons for the user's non-consumption state and the user's interest scores in a topic of the content item. This step may be performed, for example, locally by the consumption monitoring system based on instructions received from the content controller 125. Or, this step may be performed, for example, by the content controller 125 or another device upon receiving the non-consumption report from the consumption monitoring system.

Figure 5:
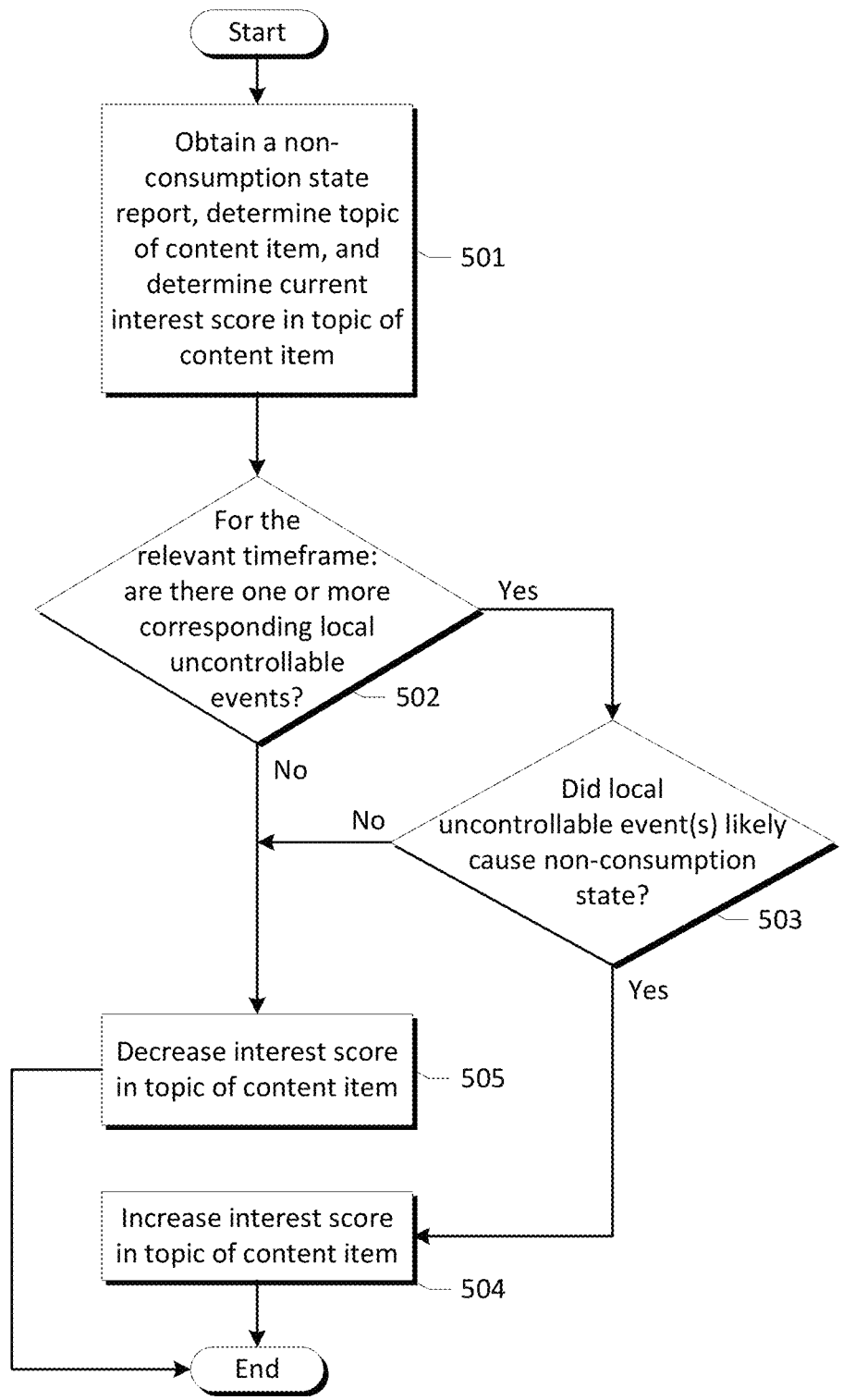
FIGS. 5-8 illustrate example flow charts for performing methods in accordance with one or more aspects as described herein.

In order for the computing device to obtain the user's interest scores in a content item, the computing device may perform the illustrative method depicted in FIG. 5. The user's interest score may be based at least in part on the user activity and environmental data including local uncontrollable events that may have diverted the user's attention. The method of FIG. 5 and/or one or more steps thereof may be performed by a computing device (e.g., content controller 125). The method illustrated in FIG. 5 and/or one or more steps thereof may be embodied, for example, in computer-executable instructions that are stored in a computer-readable medium, such as a non-transitory computer-readable memory. In some instances, one or more of the steps of FIG. 5 may be performed in a different order and/or combined. In some instances, one or more of the steps of FIG. 5 may be omitted and/or otherwise not performed. While the below steps with respect to FIG. 5 will be described with respect to being performed by the content controller 125, the steps of FIG. 5 may be performed by the consumption monitoring system and/or one or more other devices.

As seen in FIG. 5, the method may begin at step 501 in which the content controller 125 may obtain a non-consumption state report (discussed above) from the consumption monitoring system. Further, the content controller 125 may also determine a topic of the content item that was being provided when the user entered a non-consumption state. In some instances, the non-consumption state report itself may include an identifier of the content item (e.g., a program identifier, title, etc.). In further instances, the non-consumption state report may include an identifier of the stream so that the content controller 125 may determine the content item's identifier by looking up the content item in a program schedule database using the stream identifier and the timestamp of the user's non-consumption state. In either instance, the content controller 125 may use the content item's identifier to determine the topic of the content item by querying a database correlating topics to content items. Additionally, the content controller 125 may determine a current interest score in the topic of the content item. In some instances, the content controller 125 may assign a default interest score when, for example, the content controller 125 does not find a user's past interest score for the topic. In further instances, the content controller 125 may query a database, using an identifier of the user and an identifier of the topic, to determine a user's most-recent past interest score for the topic (e.g., determined from a previous analysis using of a user's non-consumption state for a different content item having the same topic) and may identify that interest score as the user's current interest score in the topic of the content item.

In step 502, the content controller 125 may, for the relevant timeframe (e.g., the determined dynamic timeframe), determine whether there are one or more corresponding local uncontrollable events using the data from the non-consumption state report. A local uncontrollable event may be one or more events that occurred in the user's environment but might not have been initiated by the user. As an example, a ringing doorbell or phone may be considered a local uncontrollable event. If the content controller 125 determines that there were one or more uncontrollable events, then, in step 503, it may determine whether the local uncontrollable event(s) likely caused the user's non-consumption state. Following the doorbell example, if the non-consumption report also includes an indication that the user answered the door in the relevant timeframe, then the content controller 125 may determine that the user's non-consumption state was caused by the uncontrollable event and, in step 504, may increase (or, alternatively, maintain) the user's current interest score in the topic of the content item since the uncontrollable event caused the user's attention to be diverted from consuming the content item. As an example, if the user's current interest score in the topic is 7 out of 10 (e.g., a maximum score). The content controller 125 may increase the score to 8, 9, 10, etc. and may store the increased score in a topic database. However, there may be one or more exceptions where the user's interest score should be decreased rather than increased in response to determining that the uncontrollable event caused the user's non-consumption state if, for example, the content controller 125 determines that the user typically ignores a particular uncontrollable event, which may be stored in a habits database in the headend. As an example, if the user habitually does not answer the phone when his or her mother-in-law calls, but the user does in fact answer the phone, this may indicate that the user is not interested in the topic of the content item and, as a result, the content controller 125 may reduce the user's interest score in the topic of the content item.

Otherwise, if either there were no local uncontrollable events or if the uncontrollable events did not likely cause the user's non-consumption state, the content controller 125 may, in step 505, decrease the user's current interest score in the topic of the content item. For example, the content control 125 may decrease the user's current interest score in the topic from 7 out of 11 to 5 or 6 out of 11 since no uncontrollable event caused the user's non-consumption state which may indicate that the user is not interested in the topic.

Additionally, the user's interest score in the topic of the content item may be modified (increased or decreased) based on the user's actions. As discussed above, the non-consumption state report might not only include environmental data used in determining local uncontrollable events but may also include user activity data. As an example, a user may have requested, searched for, and/or otherwise is interacting with a webpage during the relevant timeframe. If the topic of the webpage matches the topic of the content item, the content controller 125 may increase the user's interest score in the topic. If not, the content controller 125 may decrease the user's interest score in the topic. As another example, if the user's heartbeat is above a preset threshold during a preset time period (e.g., a few seconds) before the user entered a non-consumption state, the content controller 125 may determine that the user is excited about the topic and may increase the user's interest score in the topic. As yet another example, if the user is cheering about the topic, the content controller 125 may increase the user's interest score in the topic.

Following the example depicted in FIG. 4, the content controller 125 may determine, for the relevant timeframe around time T1, that the user experienced an uncontrollable event (e.g., the ringing of the phone 117 for the incoming call) (steps 501 and 502). The content controller 125 may also determine that the incoming call caused the user's non-consumption state based on the indication that the user answered the call (step 503). The content controller 125 may increase or maintain the user's interest score in the topic of the content item provided to the user at time T1 (unless the user habitually ignores calls from this person, in which case the user's interest score in the topic of the content item provided at time T1 may be reduced).

Returning to FIG. 3, if the content controller 125 determines that the user's interest score is below a minimum interest score threshold, the content controller 125 may optionally perform step 305 by taking action to regain the user's attention. For example, if the minimum interests score threshold is 7 and the user's interest score is 6, the content controller 125 may determine that the user's interest score is below the minimum interest score threshold. In some instances, the minimum interest score threshold may vary based on time of day, day of week, etc. For example, during the morning, the user may be getting ready for work and have the television on in the background. As a result, during the morning, the minimum interest score threshold may be set to 3. In the evening (e.g., during primetime), the minimum interest threshold may be set to 8. In some instances, the minimum interest score threshold may vary based on content (e.g., a user's favorite show may have a higher minimum interest score threshold than shows which are being rerun).

The content controller 125 may then select another content item having a different topic to replace the content item currently being provided to the user. The content controller 125 may select a topic for which the user has an interest score that is above the minimum score threshold and, optionally, the topic that has the user's highest interest score by querying a database containing the user's topic scores and corresponding topics using an identifier of the user and performing the appropriate selection. The content controller 125 may then select a content item having the selected topic from a set of multiple content items to replace or supplement the content item currently being provided to the user and for which the user might not have an interest in so that the user's attention may be regained. The content controller 125 may also select the content item based on the user's commonality or demographic association with one or more groups discussed more in further detail below in step 306. In one example, an advertisement or commercial for feminine skin products currently being displayed to the user may be replaced with an advertisement or commercial for car products. For instance, the content controller 125 instruct another device (e.g., content server) to provide the replacement content item (e.g., the replacement advertisement or commercial) to the content presentation device, a controller (e.g., set-top box, etc.) of the content presentation device, and/or the consumption monitoring system to forward to the content presentation device so that the content presentation device may provide and/or otherwise output (e.g., display) the replacement content item to the user. In some cases, the content controller 125 may retrieve the replacement content item and provide the content item to the appropriate device.

The process of steps 301-305 may be repeated until the user's attention is regained or has an interest score that is above the minimum score threshold. If the replacement content item did regain the user's attention, the consumption monitoring system may take some action, such as informing the content controller 125 of such so that the content controller 125 may, in response, increase the user's interest level score in the topic of the replacement content item. If the content controller 125 determines that the user's interest score in topic of the content item currently being provided is greater than or equal to the minimum interest score threshold, the content controller 125 might not take action to regain the user's attention thereby continuing to provide the currently-provided content item via the content presentation device.

Following the example of FIG. 4, the content presentation device may present a replacement content item that regains the user's attention (step 305). The consumption monitoring system may repeatedly collect user activity data and/or environmental data from the sensor devices (step 301) and repeatedly determine whether the user is consuming the content item (step 302). The consumption monitoring system may present or change the content if attention is lowered and may also monitor if attention increases as a result of the changed content. As time progresses, different content items may be presented to the user. In this example, a different content item may be presented at time T3 at which point the consumption monitoring system determines that the user is present but reading e.g., via an optical sensor. The consumption monitoring system may generate a non-consumption state report and send it to the content controller 125, which may then determine if there was a local uncontrollable event. Since there was not a local uncontrollable event, the content controller 125 may reduce the user's interest score in the content item provided at time T3. Alternatively, in some instances, the content controller 125 may reduce the user's interest score in the topic because the user is reading a webpage having a topic that does not match the topic of the content item. In other instances, the content control 125 may increase the user's interest score in the topic because the user is reading a webpage having a topic that matches the topic of the content item.

In step 306, the content controller 125 may determine commonality amongst users (e.g., in various user premises 102) and/or demographics. The content controller 125 may form many groups based on one or more demographic characteristics of users (e.g., age, gender, etc.) and store the groupings in a demographic database. The content controller 125 may assign the user to one or more groups that have one or more matching characteristics to that of the user. Within each grouping, one or more topics may be associated with a corresponding interest score for the group that is updated based on each member's interest score in that topic (e.g., an average of interest score in the topic) for use in selecting replacement content items.

In step 307, the content controller 125 may use the groups' interest score in a topic when determining/modifying future content (e.g., when determining what replacement or supplemental content items (e.g., advertisements) to display to the user in the future). The content controller 125 may also learn the habits of the user based on the user's activity and/or environmental data, and store the user's habits in the habits database discussed above in steps 304 and 504. For instance, if the user typically does not pick up calls from his or her mother-in-law, the content controller 125 may store the user's habit of ignoring this particular uncontrollable event in the habit database.

Figure 6:
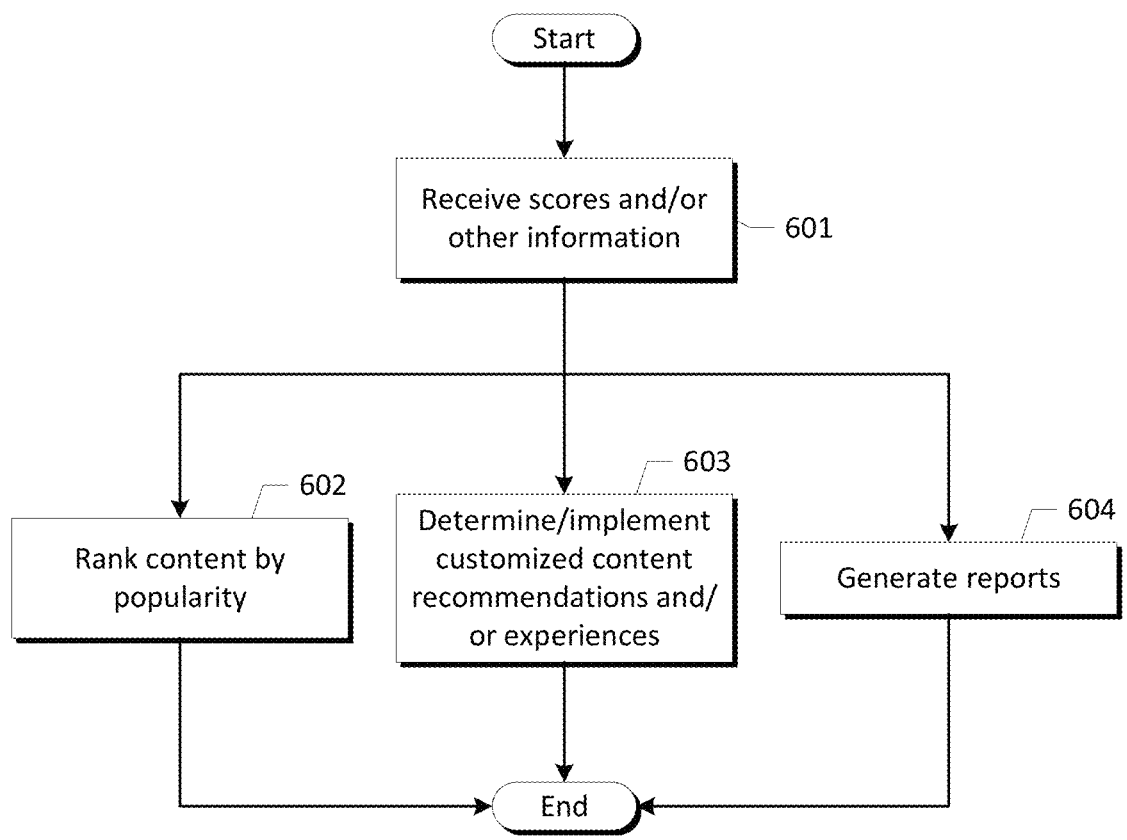

Additionally, the content controller 125 may use the group's interest scores in topics in negotiating advertisement slots. FIG. 6 depicts an illustrative method for using interests score in accordance with one or more aspects discussed herein. The method of FIG. 6 and/or one or more steps thereof may be performed by a computing device (e.g., content controller 125). The method illustrated in FIG. 6 and/or one or more steps thereof may be embodied, for example, in computer-executable instructions that are stored in a computer-readable medium, such as a non-transitory computer-readable memory. In some instances, one or more of the steps of FIG. 6 may be performed in a different order and/or combined. In some instances, one or more of the steps of FIG. 6 may be omitted and/or otherwise not performed. The results and data produced by FIG. 6 may be used in any other steps or processes disclosed herein, as needed.

As seen in FIG. 6, the method may begin at step 601 in which the content controller 125 may determine and/or otherwise receive group interest scores in one or more topics. The content controller 125 may then perform one or more of steps 602-604. In step 602, the content controller 125 may rank the topics of content items by popularity (e.g., interest score) for each group with higher interest scores correlating to higher popularity of the content item for the corresponding group. In step 603, the content controller 125 may determine and/or otherwise implement customized content recommendations and/or experiences for a group or for a user based on the group's interest scores and/or a user interest scores. As an example, if one member of a group is highly interested in a particular topic, a content item having the particular topic may be recommended to other members of the user's group by providing the recommendation to the content presentation device to output to a member of the group. The member's response (positively or negatively) may be recorded to update the group's interest score in the particular content item. In step 604, the content controller 125 may generate reports including the interests scores (e.g., group interest scores, user interest scores), topic rankings determined in step 602, and customized content recommendations/responses determined in step 603, and may transmit the reports to one or more entities for use with negotiation of the one or more advertisement slots.

Figure 7:
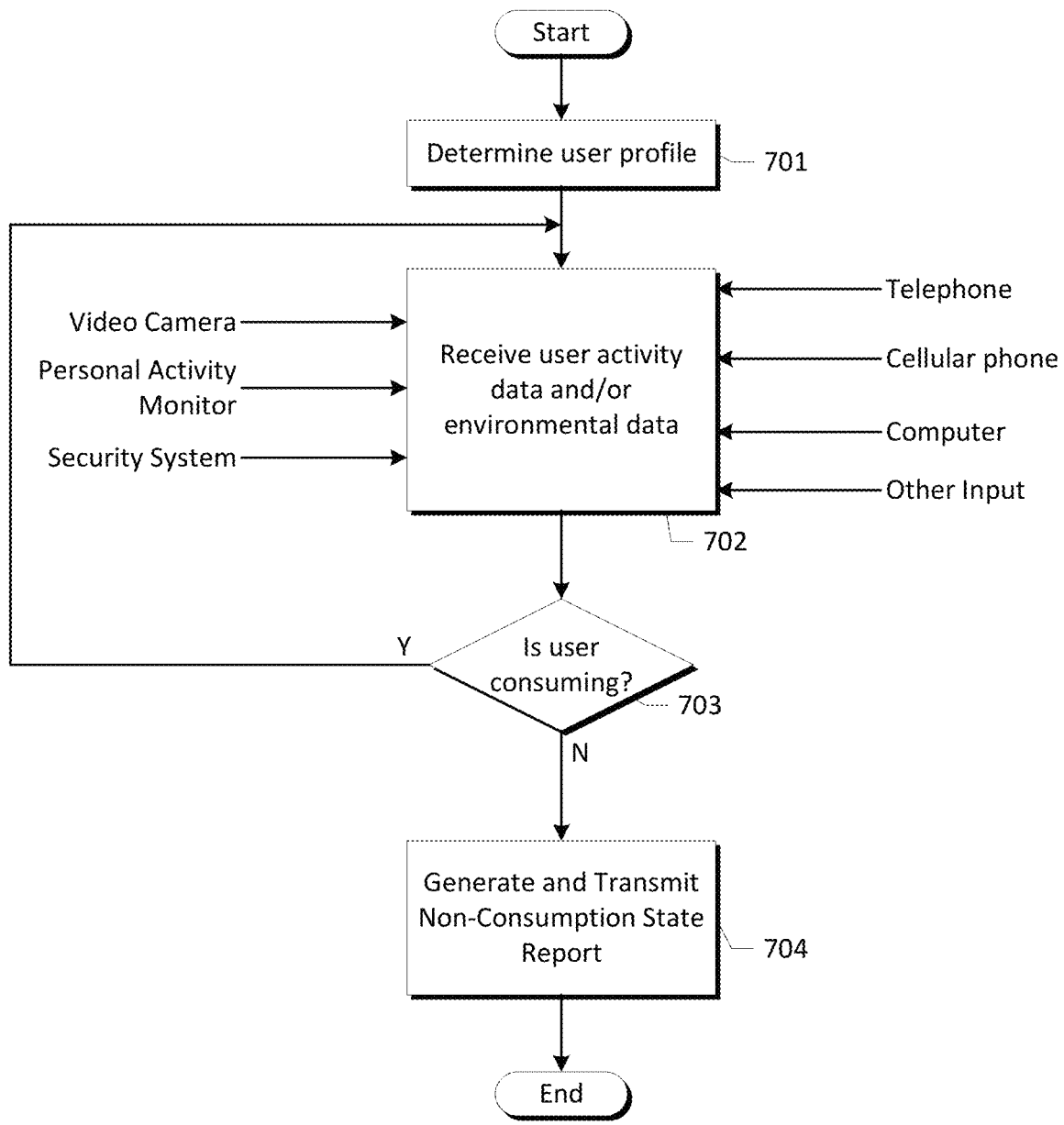

FIG. 7 depicts an illustrative method of implementing one or more aspects discussed herein. The method of FIG. 7 and/or one or more steps thereof may be performed by a computing device (e.g., consumption monitoring system). The method illustrated in FIG. 7 and/or one or more steps thereof may be embodied, for example, in computer-executable instructions that are stored in a computer-readable medium, such as a non-transitory computer-readable memory. In some instances, one or more of the steps of FIG. 7 may be performed in a different order and/or combined. In some instances, one or more of the steps of FIG. 7 may be omitted and/or otherwise not performed.

As seen in FIG. 7, the method may begin at step 701 in which the consumption monitoring system may determine a user profile. The consumption monitoring system may store multiple user profiles (e.g., one for each family member in the household). The consumption monitoring system may, using one or more sensors discussed herein, identify the user of the content presentation device. For example, the consumption monitoring system may determine which family member is using the content presentation device using facial recognition. Additionally or alternatively, the user may enter his or her identifier and/or otherwise login to his or her account and the consumption monitoring system may use this information to determine which family member is currently being provided the content items. The user profile may include the user's interest scores, records of past collected interest data and replacement content items, and the like.

In step 702, the consumption monitoring system may collect and/or otherwise receive user activity data and/or environmental data in a similar manner as discussed above in step 301. Further, in step 703, the consumption monitoring system may determine whether the user is in a consumption state in a similar manner as discussed above in step 302. If the user is in a consumption state, the consumption monitoring system may repeat steps 702 and 703. Otherwise, if the user is in a non-consumption state, the consumption monitoring system may generate a non-consumption state report (discussed above) and transmit the non-consumption state report to the content controller 125 in step 704. In one example, the consumption monitoring system may select user activity data and/or environmental data for the relevant timeframe for inclusion in the report in a similar manner as discussed above in step 303. Further, the report may also include an indication of the non-consumption state and may identify the user. At this point, the content controller 125 may receive the report and perform one or more of the steps of FIGS. 3 and 5.

Figure 8:
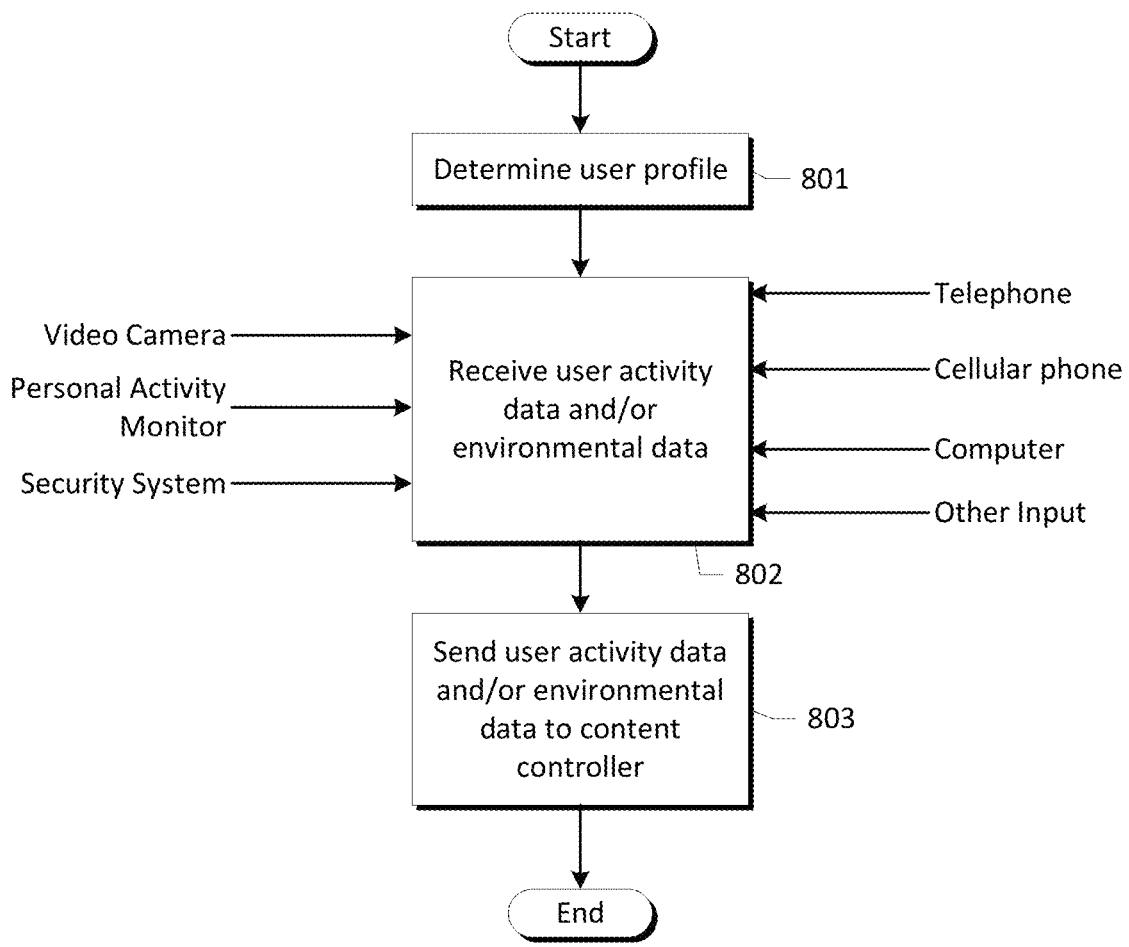

FIG. 8 depicts another illustrative method of implementing one or more aspects discussed herein. The method of FIG. 8 and/or one or more steps thereof may be performed by a computing device (e.g., consumption monitoring system). The method illustrated in FIG. 8 and/or one or more steps thereof may be embodied, for example, in computer-executable instructions that are stored in a computer-readable medium, such as a non-transitory computer-readable memory. In some instances, one or more of the steps of FIG. 8 may be performed in a different order. In some instances, one or more of the steps of FIG. 8 may be omitted and/or otherwise not performed.

As seen in FIG. 8, the method may begin at step 801 in which the consumption monitoring system may determine a user profile in a similar manner as discussed above in step 701. In step 802, the consumption monitoring system may collect and/or otherwise receive user activity data and/or environmental data in a similar as discussed above in step 702.

However, rather than locally determining whether the user is consuming a content item (e.g., whether the user is in a consumption state or a non-consumption state), the consumption monitoring system may, in step 803, continuously or periodically send each (e.g., all) of the collected user activity data and/or environmental data to the content controller 125 so that the content controller 125 may perform the determination of whether the user is consuming the content item and the relevant timeframe. Offloading some or all of the consumption state processing may allow the consumption monitoring system at the user premises to be a thin device with less processing power, and thus potentially be a less expensive device to produce. This may further allow existing devices at the user premises (e.g., STB, gateway, modem, etc.) to be reprogrammed to act as consumption monitoring systems, even though such existing devices may not have sufficient resources to locally implement many of the steps in the various flow charts described herein. In some instances, the consumption monitoring system may send a user identifier to the content controller 125.

While in the above examples, the content presentation device presenting the content items was a television, the device may be any content presentation device, such as but not limited to a display device (e.g., a computer monitor, tablet, smartphone, or any other display device capable of displaying video and/or audio content) or an audio-only presentation device (e.g., a streaming audio radio, automobile audio system, etc., capable of presenting audio content). The systems, apparatus, and methods described herein, for example, may be used to obtain and/or analyze user activity data and/or other information to ascertain the user's environment, which may ultimately allow for a determination of a reason why a user is not consuming (e.g., viewing) the content item.

The descriptions above are merely example embodiments of various concepts. They may be rearranged/divided/combined as desired, and one or more components or steps may be added or removed without departing from the spirit of the present disclosure. The scope of this patent should only be determined by the claims that follow.

The invention claimed is:

1. A method comprising:
during output of a first portion of a content item and by a computing device:
generating, by using at least one of a camera, a microphone, or a personal activity monitor, user data indicating physical movements of a user at a premises; and
detecting, via a premises monitoring system, a notification event at one or more other devices at the premises;
determining, based on the user data, a first time associated with the user stopping viewing of the content item;
determining, based on a correlation between the first time and a second time associated with the notification event, an interest score in a topic associated with the content item; and
causing, based on the determined interest score, output of a second portion of the content item.

2. The method of claim 1, wherein the causing the output of the second portion of the content item is further based on a determination that the determined interest score satisfies a criterion.

3. The method of claim 1, further comprising:
determining, by the computing device, during the output of the content item and based on the user data, a third time associated with the user stopping viewing of the content item; and
based on determining that the third time does not correlate with a fourth time associated with a second notification event, causing output of a second content item.

4. The method of claim 1, wherein the detecting the notification event comprises detecting, using the microphone, a sound, and
wherein the determining the interest score is further based on a distance of an origin of the sound.

5. The method of claim 1, wherein the generating the user data is further based on an indication of a received signal strength for a device associated with the user.

6. The method of claim 1, wherein the notification event comprises:
a door or a window being opened or closed;
a doorbell ringing;
a phone ringing or receiving a message;
a home alarm ringing; or
a change in status of an appliance.

7. The method of claim 1, further comprising:
detecting, using the camera, an eye focus of the user relative to a display device outputting the content item, wherein the determining the first time associated with the user stopping viewing of the content item is further based on the detected eye focus of the user.

8. A computing device comprising:
one or more processors; and
memory storing instructions that, when executed by the one or more processors, cause the computing device to:
during output of a first portion of a content item:
generate, by using at least one of a camera, a microphone, or a personal activity monitor, user data indicating physical movements of a user at a premises; and
detect, via a premises monitoring system, a notification event at one or more other devices at the premises;
determine, based on the user data, a first time associated with the user stopping viewing of the content item;
determine, based on a correlation between the first time and a second time associated with the notification event, an interest score in a topic associated with the content item; and
cause, based on interest score, output of a second portion of the content item.

9. The computing device of claim 8, wherein the instructions, when executed by the one or more processors, cause the computing device to cause the output of the second portion of the content item further based on a determination that the interest score satisfies a criterion.

10. The computing device of claim 8, wherein the instructions, when executed by the one or more processors, further cause the computing device to:
determine, during the output of the content item and based on the user data, a third time associated with the user stopping viewing of the content item; and
based on a determination that the third time does not correlate with a fourth time associated with a second notification event, cause output of a second content item.

11. The computing device of claim 8, wherein the instructions, when executed by the one or more processors, cause the computing device to detect the notification event by detecting, using the microphone, a sound, and
wherein the instructions, when executed by the one or more processors, cause the computing device to determine the interest score further based on a distance of an origin of the sound.

12. The computing device of claim 8, wherein the instructions, when executed by the one or more processors, cause the computing device to generate the user data further based on an indication of a received signal strength for a device associated with the user.

13. The computing device of claim 8, wherein the notification event comprises:
a door or window being opened and closed;
a doorbell ringing;
a phone ringing or receiving a message;
a home alarm ringing; or
a change in status of an appliance.

14. The computing device of claim 8, wherein the instructions, when executed by the one or more processors, further cause the computing device to detect, using the camera, an eye focus of the user relative to a display device outputting the content item, wherein the determining the first time associated with the user stopping viewing of the content item is further based on the detected eye focus of the user.

15. A system comprising:
a computing device; and
a premises monitoring system, wherein the computing device is configured to:
during output of a first portion of a content item:
generate, by using at least one of a camera, a microphone, or a personal activity monitor, user data indicating physical movements of a user at a premises; and
detect, via the premises monitoring system, a notification event at one or more other devices at the premises;
determine, based on the user data, a first time associated with the user stopping viewing of the content item;
determine, based on a correlation between the first time and a second time associated with the notification event, an interest score in a topic associated with the content item; and
cause, based on the interest score, output of a second portion of the content item.

16. The system of claim 15, wherein the computing device is configured to cause the output of the second portion of the content item further based on a determination that the interest score satisfies a criterion.

17. The system of claim 15, wherein the computing device is further configured to:
determine, during the output of the content item and based on the user data, a third time associated with the user stopping viewing of the content item; and
based on a determination that the third time does not correlate with a fourth time associated with a second notification event, cause output of a second content item.

18. The system of claim 15, wherein the computing device is configured to detect the notification event by detecting, using the microphone, a sound, and
wherein the computing device is configured to determine the interest score further based on a distance of an origin of a sound.

19. The system of claim 15, wherein the computing device is further configured to generate the user data is further based on an indication of a received signal strength indication for a device associated with the user.

20. The system of claim 15, wherein the notification event comprises:
a door or window being opened and closed;
a doorbell ringing;
a phone ringing or receiving a message;
a home alarm ringing; or
a change in status of an appliance.

21. The system of claim 15, wherein the computing device is further configured to detect, using the camera, an eye focus of the user relative to a display device outputting the content item, wherein the determining the first time associated with the user stopping viewing of the content item is further based on the detected eye focus of the user.

\* \* \* \* \*